United States Patent [19]
Greenwood et al.

[11] 3,913,885
[45] Oct. 21, 1975

[54] VALVE

[75] Inventors: Marvin H. Greenwood; Walter W. Powell, both of Houston, Tex.

[73] Assignee: Anderson, Greenwood & Co., Houston, Tex.

[22] Filed: Feb. 16, 1973

[21] Appl. No.: 333,219

Related U.S. Application Data
[63] Continuation-in-part of Ser. No. 113,303, Feb. 8, 1971, abandoned.

[52] U.S. Cl. .................. 251/63; 251/64; 92/207; 92/247; 277/144; 277/176
[51] Int. Cl.² ................. F16J 9/08; F16K 31/122
[58] Field of Search .......... 251/63, 64, DIG. 1, 368; 277/188, 176, 177, 144; 92/181, 182, 207, 247

[56]  References Cited
UNITED STATES PATENTS

| | | | |
|---|---|---|---|
| 748,233 | 12/1903 | Swan | 92/247 |
| 2,409,764 | 10/1946 | Jessup | 92/247 X |
| 2,427,789 | 9/1947 | Kehle | 277/171 |
| 2,914,369 | 11/1959 | Hayman | 92/247 X |
| 3,042,431 | 7/1962 | Kryzer | 277/177 X |
| 3,118,682 | 1/1964 | Fredd | 277/188 X |
| 3,260,275 | 7/1966 | Armstrong et al. | 251/63 X |
| 3,318,256 | 5/1967 | Green | 277/188 X |
| 3,455,566 | 7/1969 | Hull et al. | 277/188 X |

*Primary Examiner*—Arnold Rosenthal
*Attorney, Agent, or Firm*—Jack R. Springgate; Joe E. Edwards; M. H. Gay

[57] ABSTRACT

A pressure responsive valve having a body with an inlet, and outlet, a valve seat, a bore in the body, a valve member exposed to the pressure of an actuating fluid and adapted to move with respect to said valve seat to control the flow through the valve and stabilizing means for developing frictional forces responsive to the pressure of the actuated fluid between the valve member and the walls of the bore in which the valve member reciprocates to stabilize its movement. This abstract is neither intended to define the invention of the application which, of course, is measured by the claims, nor is it intended to be limiting as to the scope of the invention in any way.

9 Claims, 5 Drawing Figures

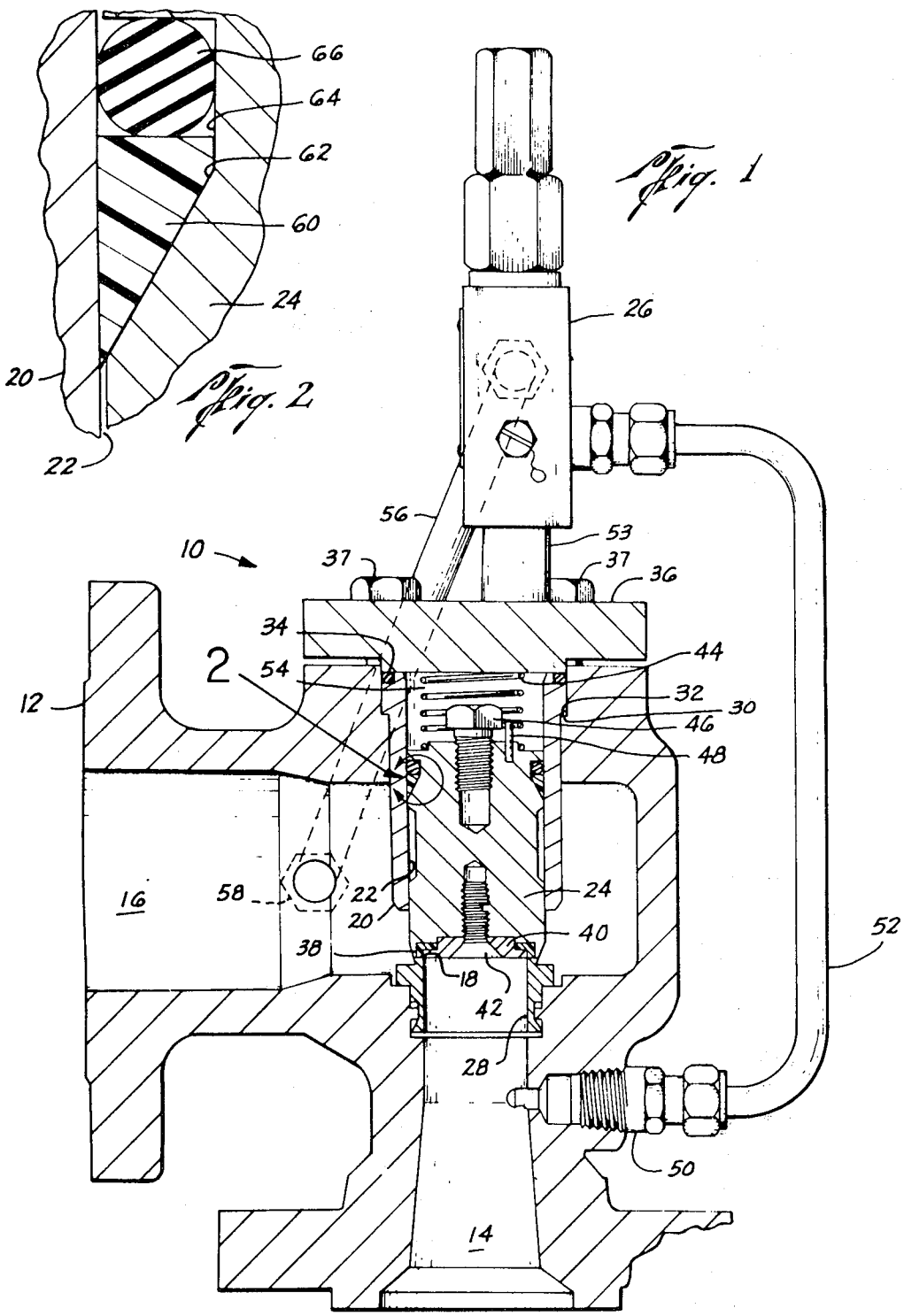

VALVE

CROSS REFERENCE TO RELATED APPLICATION

The present application is a continuation-in-part application of our prior copending application Ser. No. 113,303, filed Feb. 8, 1971, and now abandoned.

BACKGROUND OF THE INVENTION

Certain valves such as piston operated, pressure relief valves, particularly the larger sizes and those operating at elevated pressures are subject to valve chatter. At times such chatter can be of sufficient force to become destructive. The present invention is directed to providing a structure to eliminate valve chatter in such valves.

SUMMARY

The present invention relates generally to an improved pressure responsive valve and more particularly to an improved pressure responsive valve which includes pressure actuated means for stabilizing the movement of the valve member to prevent the valve from chattering during use.

An object of the present invention is to provide an improved pressure responsive valve which is not subject to valve chatter.

A further object is to provide an improved piston operated, pressure relief valve having a means to stabilize the movement of the piston.

Still another object is to provide an improved piston operated, pressure responsive valve having a controlled induced friction which is responsive to the pressure of the actuating fluid and stabilizes the movement of the piston.

Another object is to provide an improved stabilization of movement for free pistons.

BRIEF DESCRIPTION OF THE DRAWINGS

These and other objects and advantages of the present invention are hereinafter set forth and explained with respect to the drawings wherein:

FIG. 1 is a sectional view of an improved valve of the present invention including the drag stabilizing means on the valve member.

FIG. 2 is an enlarged sectional view of the area bounded by the circle designated 2 in FIG. 1 and showing the details of the pressure responsive stabilizing means of the present invention.

DESCRIPTION OF THE PREFERRED EMBODIMENT

Figure 3:
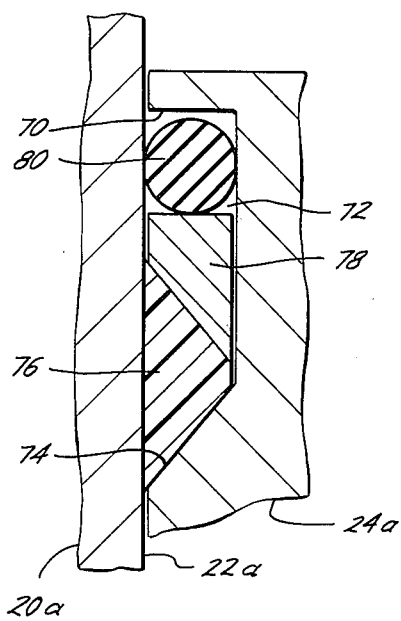
FIG. 3 is an enlarged sectional view similar to FIG. 2 of a modified form of the pressure responsive stabilizing means of the present invention.

The valve 10 shown in FIG. 1 includes the body 12 having an inlet 14, an outlet 16, a valve seat 18 which surrounds the communication between the inlet 14 and the outlet 16, the sleeve 20 having the central bore 22 in which the valve member 24 is slidably positioned and also includes the pilot valve 26. The seat insert 28 which is suitably sealed to the walls of body 12 provides the valve seat 18. The sleeve 20 has an external shoulder 30 which is adapted to seat on the internal shoulder 32 in body 12 when the sleeve is properly positioned. Also suitable sealing means is provided, such as O-ring 34, to seal between sleeve 20 and cover 36 and between the sleeve 20 and the body 12. Bolts 37 secure cover 36 to body 12.

The valve member 24 is provided with a resilient seat engaging ring 38 which is secured to the seat engaging end of valve member 24 by the retainer 40 and the screw 42. Valve member 24 being slidably positioned within the bore 22 in sleeve 20 functions as the piston or pressure responsive member to control the flow of fluid through valve seat 18 and thus, since valve 10 is a pressure relief valve, to control the relieving flow of fluids through body 12. Valve member 24 is biased toward seated position on valve seat 18 by the spring 44. Bolt 46 which is threaded into the end of valve member opposite the seating end of valve member 24 is adjusted to limit the lift or opening of valve member 24 by its engagement with the inside of cover 36. Pin 48 is set in valve member 24 to retain bolt 46 in its set position.

In operation the pressure of fluid at the inlet 14 is conducted through the fitting 50 and the line 52 to the pilot valve 26. Actuating fluid under pressure which may be the fluid delivered to pilot valve 26 through line 52 is supplied through line 53 to dome chamber 54 within bore 22 between valve member 24 and cover 36 to hold valve member 24 in its seated position upon valve seat 18 when the pressure at inlet 14 is less than the preselected relieving pressure. When the pressure exceeds the preselected relieving pressure, the pilot valve opens to exhaust pressure from the dome chamber 54 through the pilot valve, and exhaust line 56 into the connection 58 communicating with the outlet 16. With pressure reduced within the dome chamber 54, the pressure under valve member 24 within inlet 14 overcomes the combined force of spring 44 and the force of pressure within dome chamber 54 to cause valve member 24 to lift off valve seat 18 thereby relieving the excess pressure within inlet 14. With the reduction of pressure within inlet 14 below the preselected relieving pressure, the actuating fluid under pressure is again supplied to dome chamber 54 from pilot valve 26 and valve member 24 moves into engagement with seat 18 to shut off flow through valve 10.

Since this movement of valve member 24 may give rise to chattering it is desired that the movement of valve member 24 be stabilized by providing a controlled drag force resisting movement of the valve member 24. This resisting force is provided by the stabilizing means which coacts between the valve member 24 and the wall of the bore 22 of sleeve 20 responsive to the pressure of actuating fluid within dome chamber 54. Such stabilizing means is provided by the wedge ring 60 which is positioned within the tapering portion of the groove 62 around the exterior of valve member 24. The groove 62 tapers outwardly in a direction away from dome chamber 54 and has a generally cylindrical portion 64 in which the O-ring 66 is positioned. O-ring 66 is thus positioned in engagement with the wide end of wedge ring 60 and seals between the wall of bore 22 and the exterior of valve member 24 so that the pressure of the actuating fluid is exerted against wedge ring 60 to force it into wedging engagement between the tapered portion of groove 62 and the wall of bore 22 as shown in FIG. 2. As shown in FIG. 2, the wedge ring 60 has an outer cylindrical surface, an inner cylindrical surface, a flat end surface and a tapered surface. Since wedge ring 60 is used in conjunction with the O-ring 66 the better control of the inner diameter by having the inner cylindrical surface assures a more positive confinement of O-ring 66 to prevent its extrusion past wedge ring 60 when exposed to pressure.

In the modified form of stabilizing means shown in FIG. 3, the valve member 24a defines the annular groove 70, the upper portion 72 of which has a cylindrical surface facing the inner bore 22a of sleeve 20a and the lower portion 74 which tapers downwardly and outwardly. The drag ring 76 has an outer cylindrical surface adapted to be in engagement with the bore 22a of sleeve 20a, a lower tapered surface adapted to be in engagement with the lower tapered portion 74 of groove 70 and an upper tapered surface which extends upwardly and outwardly. The wedge ring 78 which may be of metal is adapted to be forced by pressure above the suitable sealing means, such as O-ring 80, into wedging engagement between drag ring 76 and the cylindrical portion of groove 70. With this structure pressure above valve member 24a is exerted on O-ring 80 to force wedge ring 78 downwardly, forcing the drag ring 76 outwardly into engagement with bore 22a to provide a pressure responsive drag force for stabilizing the movement of valve member 24a.

Figure 4:
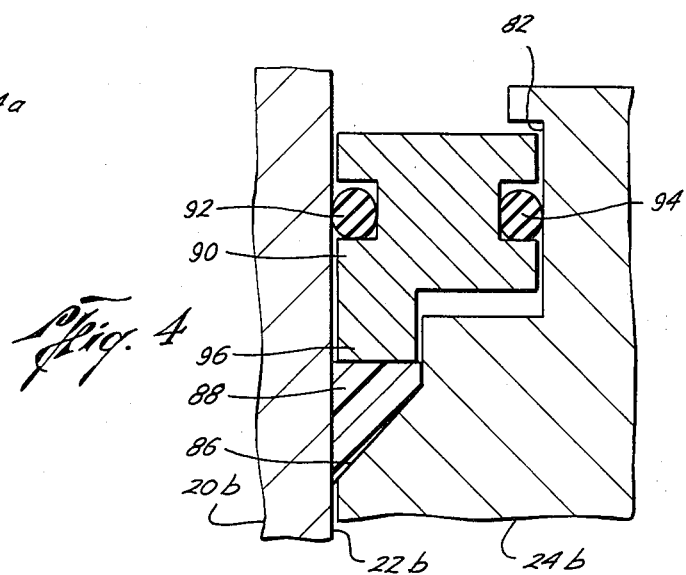
FIG. 4 is a similar view of another modified form of the pressure responsive stabilizing means of the present invention.

The stabilizing means shown in FIG. 4 provides a wedging action to develop the stabilizing drag force. In this form, the valve member 24b includes a compound groove with an upper cylindrical portion 82. The intermediate cylindrical portion 84 having a diameter larger than portion 82 and the lower tapered portion 86. The drag ring 88 is positioned to engage the tapered surface of portion 86 so that when it is subjected to a downward force, it is forced against the bore 22b of sleeve 20b. The piston ring 90 is mounted in portion 82, is provided with both inner and outer suitable sealing means, such as O-rings 92 and 94, and includes the annular depending lip 96 which extends into portion 84 and is adapted to engage the upper surface of drag ring 88. With this structure the pressure above valve member 24b is exerted on piston ring 90 which forces drag ring 88 downwardly and because of the tapered surface of portion 86 drag ring 88 is forced outwardly into engagement with the bore 22b of sleeve 20b to create the pressure responsive stabilizing drag force. The angle of taper and the large area of piston ring 90 compared to the area of the top of drag ring 88 provide a multiplication of force so that the force producing the stablizing drag is much larger than the direct force which would result from pressure on the top of drag ring.

Figure 5:
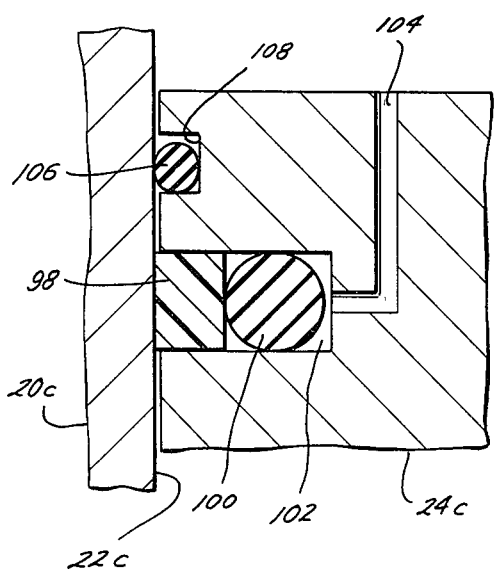
FIG. 5 is a similar view of still another modified form of the pressure responsive stabilizing means of the present invention.

Another modification of stabilizing means structure is shown in FIG. 5. This stabilizing means does not utilize the wedging action of a tapered drag ring or a wedge ring but rather provides a pressure responsive drag ring 98 which is loaded by a suitable sealing means, such as O-ring 100, on its inner surface. Drag ring 98 and O-ring 100 are positioned in the groove 102 around the exterior of valve member 24c. The inside of groove 102 is in communication through passage 104 with the pressure fluid above valve member 24c. A suitable sealing means, O-ring 106 in groove 108, is provided between valve member 24c and the bore 22c of sleeve 20c above drag ring 98. The actuating fluid pressure is exerted through passage 104 on O-ring 100 to force drag ring 98 outwardly into engagement with bore 22c to produce the stabilizing force. In this form of the stabilizing structure the amount of force for producing drag is a direct function of pressure without any multiplication such as results from the tapers and large area piston ring of the other forms of stabilizing means previously discussed. The drag ring 98 may be split rather than being a complete ring to accommodate expansion. Normally such split will be along a plane perpendicular to a radial line. It should be noted that all forms of the drag rings of the present invention may be split provided they are split in a manner to prevent extrusion of the ring through the gap between the valve member or piston and the cylinder in which it is mounted since the sealing to create the pressure force is provided by a sealing means rather than by the drag rings.

In the use of the wedge ring it is preferred that the wedge ring 60 and the drag rings 76, 88 and 98 be made of a material which has static and dynamic coefficients of friction which are as close as possible. Materials such as nylon and polytetrafluoroethylene have been found suitable. For example, in a relief valve set at 800 p.s.i. and having a 4 inch diameter by 6 inch long piston or valve member 24 with a 15° polytetrafluoroethylene wedge ring, tests revealed that the drag of the O-ring is 52 pounds and the drag of the wedge ring is 162 pounds. In this valve the dome pressure reduction for operation responsive to inlet pressure is approximately thirty percent which can be easily handled with existing pilot valves. In another relief valve at 800 p.s.i. and having an 8 inch diameter by 8 inch long valve member or piston with an O-ring having a cross-sectional area of 0.275 square inches, the O-ring drag is 170 pounds and the drag of a 15° polytetrafluoroethylene wedge ring is 2000 pounds. The resulting reduction in dome pressure for operation is 35%. In the same valve with an O-ring having a cross-sectional area of 0.139 square inches the O-ring drag is 105 pounds and the wedge drag is 1200 pounds resulting in a dome pressure reduction for operation of 30%.

Tests have been conducted with the valve mentioned in the above examples to check for critical wedging. Valves were exposed to fluid pressure of 1000 p.s.i. for a week and when the dome pressure was vented, their valve members were moved by pressurizing the inlet to approximately 3 p.s.i. which is consistent with standard piston type valve members without wedges.

In the selection of material for wedge ring 60 consideration should be given to the problem of critical wedging. In materials having a high coefficient of friction a small angle of taper on wedge ring 60 would result in critical wedging or a locking of the valve member 24 within sleeve 20 once full dome pressure had been applied.

A relief valve has been tested under conditions which produced chatter. When the valve member of such valve was changed to a valve member of the present invention including the wedge ring such valve was tested to try to produce chatter but no chatter was noticed under repeated cycling.

It is believed that the improved stabilizing device of the present invention has application to other piston type devices to provide a controlled drag force resisting movement of the piston. Such stabilizing devices could be used to stabilize pressure loaded free piston devices.

In the illustrated embodiment the tapered groove is shown in the exterior of the valve member but it should be noted that such groove may be defined in the walls of the bore so that the wedge ring coacts with the exterior cylindrical surface of the valve member.

From the foregoing it can be seen that the improved relief valve of the present invention is provided with a pressure responsive stabilizing means which protects the valve from valve chatter.

The foregoing disclosure and description of the invention are illustrative and explanatory thereof and various changes in the size, shape and materials, as well as in the details of the illustrated construction, may be made within the scope of the appended claims without departing from the spirit of the invention.

What is claimed is:

1. A valve comprising a body having an inlet, an outlet and a valve seat surrounding communication through said body between said inlet and said outlet,
   a bore defined within said body,
   a valve member positioned to reciprocate within said bore and adapted to move into and from engagement with said valve seat to control flow through said body, said valve member and said bore defining mutually facing parallel surfaces,
   means supplying a controlled pressure actuating fluid to one end of said valve member,
   means for sealing between said valve member and the wall of said bore,
   a tapered groove formed in one of said surfaces and having an angle of taper from 10° to 20° in a section with respect to said bore wall and with the angle of said groove opening toward the end of said valve member to which said actuating fluid is supplied, and
   pressure responsive means to provide a drag force resisting relative movement of said valve member and said bore, said pressure responsive means including wedge ring having a tapered surface preformed with the same angle of taper as said groove, said wedge ring being positioned in said groove and urged therein to be forced by the incline of said groove against the other of said surfaces whereby the movement of said valve member is stabilized by the drag forces created by the forcing of said wedge ring against the other surface responsive to the pressure of actuating fluid exerted against said valve member.

2. A valve according to claim 1, wherein said wedge ring material is polytetrafluoroethylene.

3. A valve according to claim 1, wherein said wedge ring material is nylon.

4. A valve according to claim 1, wherein said wedge ring is formed of a material having approximately equal static and dynamic coefficients of friction.

5. A valve according to claim 1, wherein said wedge ring has an angle of taper of 15°.

6. A valve according to claim 1 wherein said wedge ring is a split ring.

7. A valve according to claim 1 wherein said sealing means includes
   an O-ring positioned against the wide end of said wedge ring and sealing between said valve member and the wall of said bore to transmit the force of actuating fluid to said wedge ring to force said wedge ring into tighter engagement with said valve member and the wall of said bore.

8. A valve according to claim 1 including
   an annular piston positioned between said valve member and said bore wall and having a depending flange in engagement with said wedge ring,
   the surface of said piston opposite said flange being exposed to the pressure exerted on said valve member to force said wedge ring responsive to pressure into frictional engagement with said bore wall.

9. A valve according to claim 1 including
   a second ring,
   said wedge ring having a second taper opposite its taper which engages in said tapered groove,
   said second ring having a taper in an inwardly direction proceeding away from the pressure face of said valve member and mating with the taper on said wedge ring,
   said sealing means exerting a force on said second ring responsive to pressure whereby such force on said second ring urges said wedge ring outwardly against said bore wall and downwardly in said tapered groove.

* * * * *